United States Patent [19]

Kobayashi et al.

[11] Patent Number: 4,739,354
[45] Date of Patent: Apr. 19, 1988

[54] FILM DRIVE DEVICE

[75] Inventors: Ryuichi Kobayashi; Masaharu Kawamura, both of Kanagawa; Tsunemasa Ohara, Tokyo; Masayuki Suzuki, Kanagawa; Yoichi Tosaka, Kanagawa; Yoshihito Harada, Kanagawa, all of Japan

[73] Assignee: Canon Kabushiki Kaisha, Tokyo, Japan

[21] Appl. No.: 15,234

[22] Filed: Feb. 17, 1987

[30] Foreign Application Priority Data

Feb. 20, 1986 [JP] Japan .................................. 61-035452

[51] Int. Cl.$^4$ .............................................. G03B 1/12
[52] U.S. Cl. .................................................. 354/173.1
[58] Field of Search ........................ 354/173.1, 173.11

[56] References Cited

U.S. PATENT DOCUMENTS 4,616,913 10/1986 Suzuki et al. .................... 354/173.1

Primary Examiner—Michael L. Gellner
Attorney, Agent, or Firm—Robin, Blecker & Daley

[57] ABSTRACT

A film drive device for a camera in which the film is transported by an electric motor as the drive source, comprises detecting means for detecting that the winding of all the frames of the film is complete, manually operable switching means for forcibly changing over the film to a rewind state, and operation control means for shifting from a film windup state to the film rewind state. The operation control means makes a first operation of shifting to the film rewind state in response to the completion of the winding by the detecting means and a second operation of shifting to the film rewind state by the operation of the switching means different from each other. Therefore, an efficient shifting to the rewind state can be performed.

12 Claims, 11 Drawing Sheets

FILM DRIVE DEVICE

BACKGROUND OF THE INVENTION

1. Field of the Invention

This invention relates to a film drive device for use in cameras.

2. Description of the Related Art

Recent developments in motorized cameras have provided the impetus for the proposition of a capability of controlling coordination of the windup and rewind systems. The prior known coordinating technique employed a changeover mechanism such as a clutch positioned in the middle of a windup transmission system and arranged to be able to transfer the driving torque of an electric motor that used to work as the drive source for motorized winding-up to a rewind transmission system. Because of only one motor in use, all what was needed to coordinate the winding-up with the rewinding was to control the on-off operation of the changeover mechanism. In the motorized camera of this kind, for switching it from the windup to rewind mode, there are two occasions, one of which occurs after all film has been exposed, and the other of which arises when the film-rewind release button is manipulated. In the latter case, an event that the operative position of the changeover mechanism is changed at a time when the film is not used up can be even encountered.

Another type of motorized camera which is different from the above-described one in that two motors, respectively for the windup motor and the rewind motor, has been also proposed.

In any of the conventional types of motorized cameras, however, the coordinating means operates always in the same manner regardless of whether the transition from the windup to the rewind mode takes place automatically as all the frames of film have been exposed, or is carried out manually by the rewind switch. Such a feature might have no problem if it is applied to, for example, the leaf shutter camera of the type in which the motor is one in number and the operation of a planetary clutch as the coordinating means is controlled by changing the direction of rotation of the motor in such a manner that the driving torque of the motor is transferred from the windup transmission system to the rewind transmission system, since nothing more than merely to change over the planetary clutch is needed.

However, if there is either one of the additional features that the windup transmission system is associated with a charge mechanism for the reflex mirror and the shutter as in the single lens reflex camera, and that, from the standpoint of high price cameras, the means for detecting when no more fresh area of film can be fed is of elaborate design, the sequence of operations beginning with the detecting one and terminating at the start of rewind of the film becomes complicated. For a motorized single lens reflex camera having both of these two additional features, therefore, it is desired to vary the sequence of operations to a simpler one with the limitation of the number of operations to a minimum depending on the situation, so that electrical energy of the battery is prevented from being wastefully consumed, and, as that sequence advances faster, the photographer can manage his camera quickly and easily.

Meanwhile, the film windup transmission system of the above-described motorized single lens reflex camera is made to perform a high speed transportation of the film with a relatively low speed reduction in order to increase the number of film cartridges to be processed for a pack of batteries, leaving the number of batteries in the pack as an electrical power source not to be too much increased. Therefore, when the actual voltage of the electrical power source only somewhat lowers, or when the load of pulling the film out from the cartridge only slightly increases from the normal level, the transportation of the film is caused to stop, despite that all the frames of film have not been wound up yet. In this case, according to the prior art, an erroneous information representing the detection of the film end was given forth.

SUMMARY OF THE INVENTION

One aspect of the invention is to enable an efficient transition from the windup to the rewind mode to be carried out by differentiating a first manner in which the coordinating means operates when it is manually actuated from a second manner in which it operates when automatically actuated by the information from the detecting means which represents that all the frames of film have been wound up.

DETAILED DESCRIPTION OF THE PREFERRED EMBODIMENT

Figure 1:
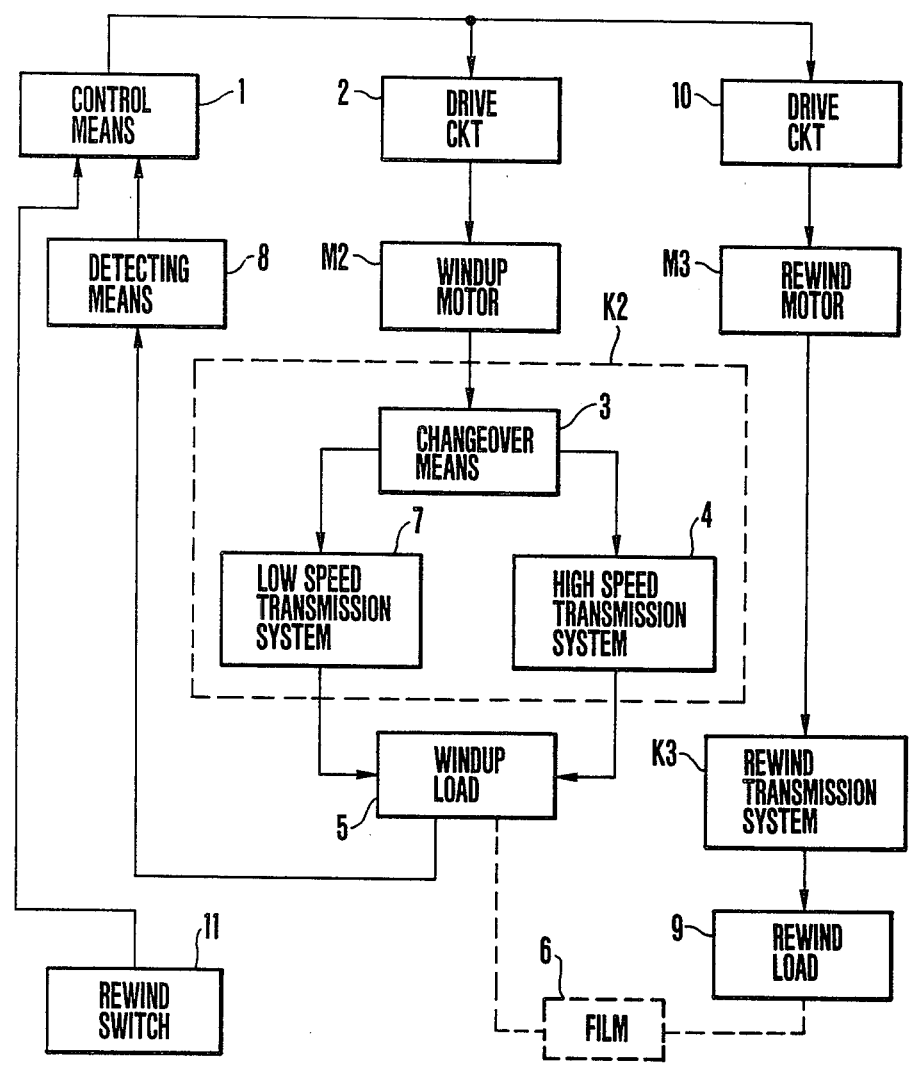
FIG. 1 is a block diagram illustrating an embodiment of the invention.

FIG. 1 illustrates the operating principle of an embodiment of the invention.

As all conditions are normal, when to start the cycle of film winding operation, control means 1 comprising, for example, a microcomputer activates a drive circuit 2 to rotate a windup motor M2 in one direction (for example, clockwise direction). Responsive to this, a changeover means 3 selects a high speed transmission system 4 of small speed reduction ratio to operate. Then, the driving torque of the windup motor M2 passes through the high speed transmission system 4 to a windup load 5 (including film 6). Hence, the film 6 is being wound up at a relatively high speed.

A detecting means 8 produces output signals representing that the winding-up is halfway, or near the termination, or that it is complete. Responsive to these signals, the control means 1 decelerates the windup motor M2, or stops its rotation.

If the film 6 is stopped as detected by the detecting means 8 despite that the windup motor M2 is being supplied with current, the control means 1 has to discriminate among situations that the film 6 has truly all been used up, that the actual voltage of the battery has fallen below the satisfactory operating level, and that the load on the windup transmission system has increased so largely that the film 6 can no longer be pulled out from the cartridge, from one another. For this purpose, the drive circuit 2 is actuated to reverse the direction of rotation of the windup motor M2 (for example, to the counterclockwise direction). Thereby, the operative position of the changeover means 3 is changed to select a low speed transmission system 7 of large speed reduction ratio in replacement of the high speed one 4. Hence, the driving torque at the takeup spool is increased. If, even in this stage, the film 6 remains stopped as detected by the detecting means 8, it is before the start of a rewinding operation that the control means 1 actuates the drive circuit 2 again to return the rotation of the windup motor M2 to the clockwise direction so that the changeover means 3 transfers the driving torque back to the high speed transmission system 4. After that, the control means 1 actuates another drive circuit 10 to rotate a rewind motor M3 in one direction. The driving torque passes through a rewind transmission system K3 to a rewind load 9. Hence, the camera is automatically switched from the windup to the rewind mode.

Meanwhile, when a rewind switch 11 which is accessible from the outside of the camera is operated by the photographer, the control means 1 actuates the second drive circuit 10 without recourse to the re-actuation of the first drive circuit 2, because, as the direction of rotation of the windup motor M2 has so far been maintained clockwise, the changeover means 3 already sets the transfer of the driving torque to the high speed transmission system 4 of small speed reduction ratio. Thus, the camera is manually switched from the windup to the rewind mode.

An example of application of the principle of the invention described in connection with FIG. 1 to a film drive device in the single lens reflex camera is shown in FIGS. 2 to 10.

Figure 2:
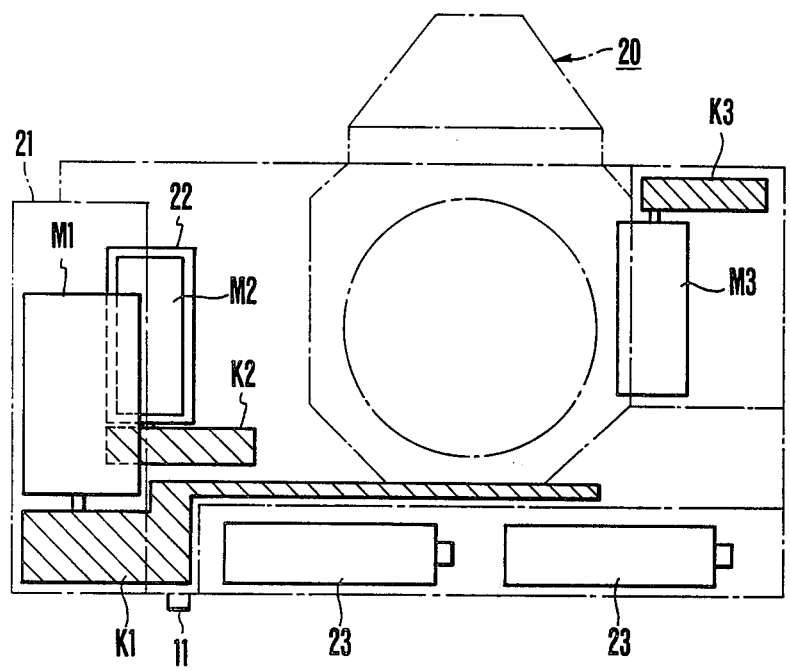
FIG. 2 is a schematic front view of a single lens reflex camera employing the principle of FIG. 1.

FIG. 2 shows how three electric motors are arranged within a camera housing as viewed from the front thereof. A charge motor M1 governs charging of a shutter, a diaphragm adjusting mechanism, a diaphragm drive mechanism and a mirror mechanism, and is put in a left hand front corner of a camera 20 as viewed from the front. As for the charge motor M1, though the load change due to the environmental factors is small, a relatively large driving torque is required, because the absolute load is large. Hence, it takes necessarily a large size. From this reason, the left hand front corner is protruded in the form of a grip 21 to create therein a space the charge motor M1 occupies. K1 is a charge transmission system for the charge motor M1. The windup motor M2 occupies a space within a spool structure 22 and is arranged adjacent to a windup transmission system K2. The rewind motor M3 has its place near a cartridge chamber on the right hand side of a mirror box, and is arranged adjacent to a rewind transmission system K3. An electrical power source 23 consists of four AA type batteries. Reference numeral 11 denotes a rewind switch which is manually operable.

Figure 3:
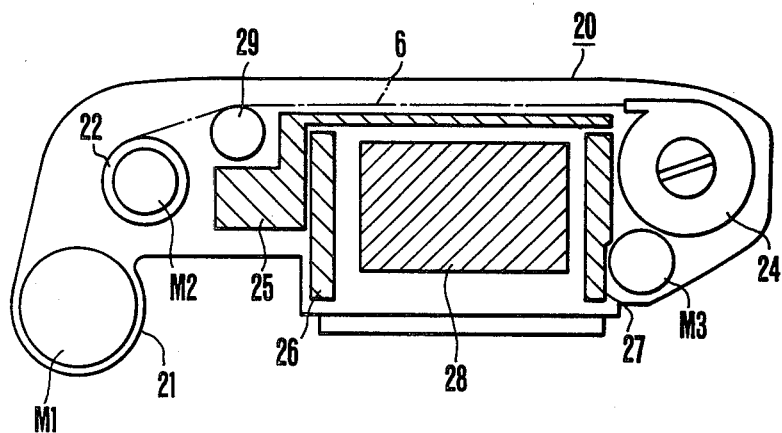
FIG. 3 is a schematic top view of the same camera.

FIG. 3 is a plan view looked from the above of the camera 20 of the arrangement of the motors M1 to M3 along with a film cartridge 24, a blade type vertically running shutter 25, a mirror mechanism 26, an adjusting mechanism 27 for a diaphragm in a lens mounting, a drive mechanism 28 for the diaphragm and a sprocket structure 29 for indexing the fed amount of film 6.

Figure 4:
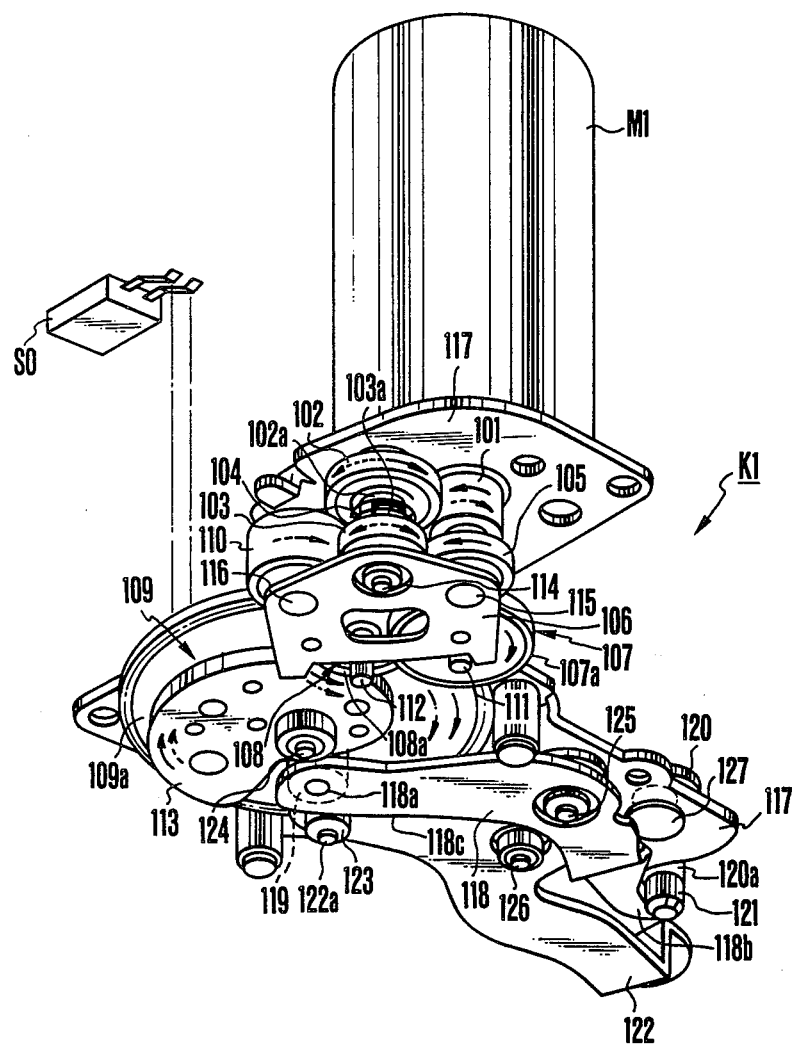
FIG. 4 is a perspective view of the charge transmission system.

In FIG. 4, there is shown the detail of the charge motor M1 and the charge transmission system K1.

A pinion gear 101 is fixed to the output shaft of the charge motor M1, and meshes with a gear 102. The gear 102 and a gear 103 constitute a 2-stage gear, and are each rotatably mounted on a common shaft 114 planted on a base plate 117. Protruded portions 102a and 103a are formed on the gears 102 and 103 respectively, alternating with each other in directions of thrust. By the engagement of these protruded portions 102a and 103a, the gears 102 and 103 move together in engagement in the direction of rotation, but freely move relative to each other in the directions of thrust. Meanwhile, the gear 103 has a surface in contact with a planetary lever 106 pivotal about the shaft 114 and frictionally contacts with the planetary lever 106 by a compression spring 104 arranged between the gears 102 and 103. Thereby, the planetary lever 106 followingly rotates in the direction of rotation of the gear 103. A gear 105 is rotatably mounted on a shaft 115 planted on the planetary lever 106 and always meshes with the gear 103. A 2-stage gear 107 has a large gear 107a and a small gear (not shown) fixedly formed on the upper surface of the gear 107a and is rotatably mounted on a shaft 111 planted on the base plate 117. When the gear 103 rotates in a clockwise direction, and the gear 105 rotates in a counterclockwise direction (indicated by arrow), the planetary lever 106 is turned in the clockwise direction, bringing the large gear 107a into engagement with the gear 105. A gear 108 is rotatably mounted on a shaft 112 planted on the base plate 117 and consists of a large gear 108a and a small gear (not shown) fixedly formed on the upper surface thereof. The large gear 108a always meshes with the small gear of the gear 107. A gear 110 is rotatably mounted on a shaft 116 on the planetary lever 106 and always meshes with the gear 103. When the gear 103 rotates in the counterclockwise direction and the planetary lever 106 turns in the counterclockwise direction, the gear 110 meshes with the large gear 108a. A cam gear 109 is rotatably mounted on a shaft 124 planted on the base plate 117, and has a gear 109a and a cam 113 formed thereon. The gear 109a always meshes with the small gear of the gear 108.

Such a transmission system from the pinion 101 to the cam gear 109 is changed over between two speed reduction ratios depending on the direction of rotation of the motor M1. That is, when the charge motor M1 rotates in the counterclockwise direction, all the parts rotate in a direction indicated by a solid line arrow with the planetary lever 106 turning in the clockwise direction to establish a low speed gear train of large reduction ratio: the pinion gear 101→the gears 102, 103→the gear 105→the gear 107 (large gear 107a, small gear)→the gear 108 (large gear 108a, small gear)→the cam gear 109. Conversely when the charge motor M1 rotates in the clockwise direction, all the parts except the cam gear 109 rotate in the reverse direction indicated by a dashed line arrow, and the planetary lever 106 turns in the counterclockwise direction to establish another or high speed gear train of small reduction ratio: the pinion 101→the gear 102, 103→the gear 110→the gear 108 (large gear 108a, small gear)→the cam gear 109. For note, these two gear trains are so arranged that the cam gear 109 always rotates in the clockwise direction regardless of which direction the rotation of the charge motor M1 takes.

A first shutter charge lever 118 is pivotally mounted on a shaft 125 planted on the base plate 117 and has one end on which is rotatably mounted a roller 119 about a shaft 118a, the other end of the which is formed to a cam 118b. The roller 119 runs on the outer periphery or camming surface of the cam 113 of the cam gear 109, giving the first shutter charge lever 118 a swinging movement that follows the displacement of the camming surface. And, this swinging movement causes the cam 118b also to swing. A second shutter charge lever 120 is rotatably mounted on a shaft 127 planted on the base plate 117, and has a roller 121 rotatable about a shaft 120a. The roller 121 is in engagement with the cam 118b so that the second shutter charge lever 120 can be swung by the swinging of the first shutter charge lever 118. And, the second shutter charge lever 120 charges a publicly known shutter mechanism (not shown).

A lever 122 for charging a publicly known aperture adjusting mechanism, a mirror operating mechanism and a drive mechanism for the diaphragm in a lens mounting, is rotatably mounted on a shaft 126 planted on the base plate 117, and has one end on which a roller 123 is rotatably mounted about a shaft 122a. This roller 123 is in engagement with a cam 118c of the first shutter charge lever 118. Therefore, the lever 122 also swings as the first shutter charge lever 118 swings, thereby the aperture adjusting mechanism, the mirror operating mechanism and others are charged.

A contact member S0 constitutes a switch together with a pulse signal substrate (not shown) fixed to the cam gear 109 and having a comb-like electrically conductive pattern thereon. This switch detects a point in time a little earlier than when the charging by the charge motor M1 is complete.

Figure 5:
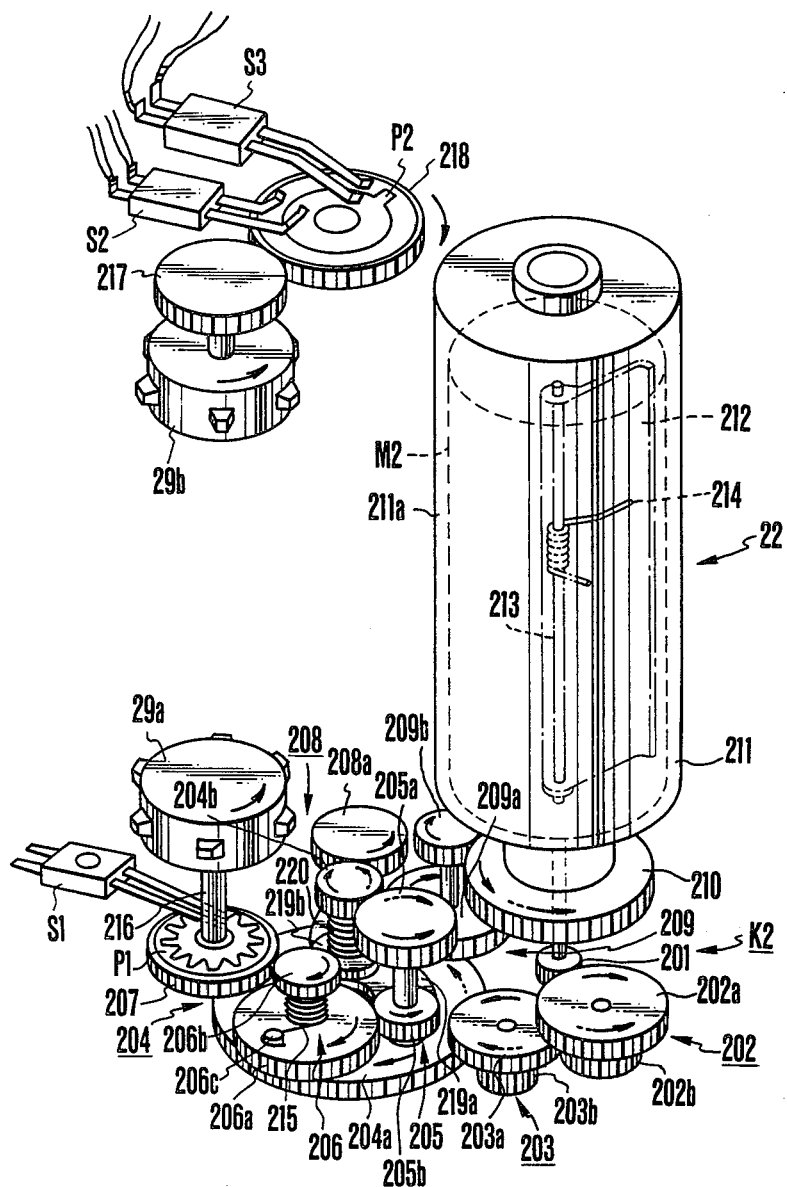
FIG. 5 is a perspective view of the windup transmission system.

In FIG. 5, there is shown the detail of the windup motor M2 and the windup transmission system K2.

A pinion 201 is fixed to the output shaft of the windup motor M2 arranged in the interior of the spool structure 22. A 2-stage gear 202 has a large gear 202a ad a small gear 202b and is rotatably mounted. The large gear 202a meshes with the pinion 201. Another 2-stage gear 203 having a large gear 203a and a small gear 203b is rotatably mounted and the large gear 203a meshes with the small gear 202b. Another 2-stage gear 204 having a large gear 204a and a small gear 204b is rotatably mounted, and the large gear 204a meshes with the small gear 203b. A planetary lever 219a is rotatably mounted on a common shaft of the 2-stage gear 204 through a bearing 219b. A compression spring 220 is arranged between the small gear 204b and the bearing 219b to bring the bearing 219b and the large gear 204a into frictional contact with each other. By this frictional contact, the planetary lever 219a is caused to turn in the same direction as that of rotation of the gear 204. A 2-stage gear 205 having a large gear 205a and a small gear 205b and another 2-stage gear 208 having a large gear 208a and a small gear (not shown) formed in fixed relation on the lower surface thereof are rotatably mounted on the planetary lever 219a. A 2-stage gear 206 is arranged adjacent the gear 205, and its large and small gears 206a and 206b are rotatably mounted independently of each other. A coil spring 215 is arranged between the large and small gears 206a and 206b with one end of the spring 215 being fixed to a boss 206c of the large gear 206a so that the spring 215 functions as a one-way clutch operating in such a manner that as the large gear 206a rotates in a clockwise direction, the coil spring 215 tightens the shaft portion of the small gear 206b, causing the small gear 206b to be rotated in unison with the large gear 206a. A gear 207 meshes always with the small gear 206b and is drivingly connected to a drive sprocket 29a through a shaft 216. A pulse disc P1 whose entire circumference is divided into 12 equal parts is fixedly mounted on the upper surface of the gear 207 and cooperates with a pair of probes of a contact member S1. So when the drive sprocket 29a rotates one revolution, the contact member S1 produces twelve pulses. With 6 teeth on the drive sprocket 29a, as the camera of 35 mm full size advances the film by one frame for four thirds of its revolution, therefore, the number of pulses produced from the contact member S1 is sixteen for each cycle of film winding operation. Needless to say, it is also possible to use a desired number of equal parts of the pulse disc P1. If the duty drive method is employed for controlling the speed of rotation of the windup motor M2, it is preferred to increase the number of equal parts.

A 2-stage gear 209 is arranged adjacent the gear 208, has a large gear 209a and a small gear 209b and is rotatably mounted. A spool gear 210 is fixed to a spool 211 of the spool structure 22, rotatably mounted, and always meshes with the small gear 209b. The surface of the spool 211 is coated with a rubber member 211a over the entire periphery thereof to promote automatic winding of the leader of the film. Further, a cover 212 is arranged adjacent the outside of the spool 211 to be pivotal about a shaft 213. A spring 214 urges the cover 212 toward the spool 211, thus performing a function of promoting the automatic winding of the film leader on the spool 211. For note, though the cover 211, shaft 213 and spring 214 are shown in only one unit, there is another unit on the opposite side.

Another sprocket 29b is driven to rotate by the moving film only. Its rotation is transmitted to a gear 217 through a common shaft and further therefrom to another gear 218 constituting part of a detector. The ratio of the number of teeth of the gear 217 to that of the gear 218 is predetermined to be 3:4. A pulse disc P2 is fixedly mounted on the upper surface of the gear 218, constituting part of each of contact members S2 and S3 which produce one pulse for one revolution of the gear 218. The contact members S2 and S3 are so arranged that the former is closed earlier than the latter by a time for a prescribed phase of rotation of the pulse disc P2. The pulse from the contact member S2 changes the driving mode of the windup motor M2 to the duty drive, thereby the windup motor M2 is decelerated. For, as the contact member S3 produces the pulse in that time, the windup motor M2 rapidly stops when it has been braked.

The control of one cycle of operation of the windup motor M2 by the pulse produced in one revolution of the detection gear 218 results in that, in the case of the camera of 35mm full size, the film is advanced one frame. Though it is as a matter of course, if the ratio of the numbers of teeth of the gear 217 and the detection gear 218 is altered to 3:2, or if, while the number-of-teeth ratio is left unchanged from 3:4, as the pulse signal substrate P3 is divided into two equal parts, one pulse is produced for every 180° of rotation, the amount of film fed in one cycle can be the half size. Also, if, in this case, the windup motor M2 is otherwise made to stop when two pulses have been counted, the amount of film fed can be returned to the full size. Further, if the number of counted pulses is made to change over between one and two, the feeding of film easily corresponds to either of the full size and the half size.

An explanation will be made about the transmission of the torque of the windup motor M2. When the windup motor M2 rotates in the counterclockwise direction, each part rotates in a direction of solid line arrow, and the gear 204 rotates in the clockwise direction, causing the planetary lever 219a to turn in the clockwise direction until the small gear 205b engages the large gear 206a, and, at the same time, the small gear of the gear 208 engages the large gear 209a. Therefore, the rotation of the windup motor M2 is transmitted as the pinion 201→the gear 202 (large and small gears 202a, 202b)→the gear 203 (large and small gear 203a, 203b)→the gear 204 (large and small gears 204a, 204b)→the gear 205 (large and small gears 205a, 205b)→the gear 206 (large and small gears 206a, 206b) the gear 207→the sprocket 29a, at a speed reduction ratio for slow movement of the film, and at the same time, the gear 204 (large and small gears 204a, 204b)→the gear 208 (large gear 208a and small gear)→ the gear 209 (large and small gears 209a, 209b)→the spool gear 210→the spool structure 22 at the speed reduction ratio for the slow rotation of the spool 211.

Conversely when the windup motor M2 rotates in the clockwise direction, as each part rotates in the direction of dashed line arrow, the gear 204 rotates in the counterclockwise direction, causing the planetary lever 219a to turn in the counterclockwise direction until the large gear 205a engages directly the spool gear 210. Therefore, the transmission system K2 is changed over to the small speed reduction ratio for fast rotation of the spool 211, comprising: the pinion 201→the gear 202 (large and small gears 202a, 202b)→the gear 203 (large and small gears 203a, 203b)→the gear 204 (large and small gears 204a, 204b)→the large gear 205a→the spool gear 210. For note, the drive sprocket 29a is cut off from the transmission system K2, becoming freely rotatable.

As will be seen from the foregoing, that part of the transmission system K2 which goes from the windup motor M2 to the spool structure 22 operates with selection of two speed reduction ratios depending on the direction of rotation of the windup motor M2. In more detail, when it is counterclockwise, the speed reduction ratio for the slow speed results. Conversely when clockwise, the other reduction ratio for the high speed results. In either of the directions of rotation, the spool structure 22 always rotates in the counterclockwise direction.

It should be pointed out that the choice of the counterclockwise rotation of the windup motor M2 is exercised only when the camera is set to an automatic film loading mode. Because the high speed reduction of the windup transmission system K2 operates, the sprocket 29a is driven to rotate, pulling the film out of the cartridge, while the fed portion of the film is taken up on the spool structure 22. In the subsequent or one-frame-at-a-time or continuous run mode, by the clockwise rotation of the windup motor M2, the windup transmission system K2 is switched to the low speed reduction, driving the spool structure 22 only to rotate at a high speed. Of course, the wind mode may otherwise be operated by the counterclockwise rotation of the windup motor M2. Even if so, no slack loop of film between the drive sprocket 29a and the spool structure 22 is formed, because the peripheral speed of the spool structure 22 is previously adjusted to be faster than that of the drive sprocket 29a. In other words, the drive sprocket 29a functions as a drive source for the film only when the film is not pulled by the spool structure 22. For the other time, it acts merely as an idler.

Figure 6:
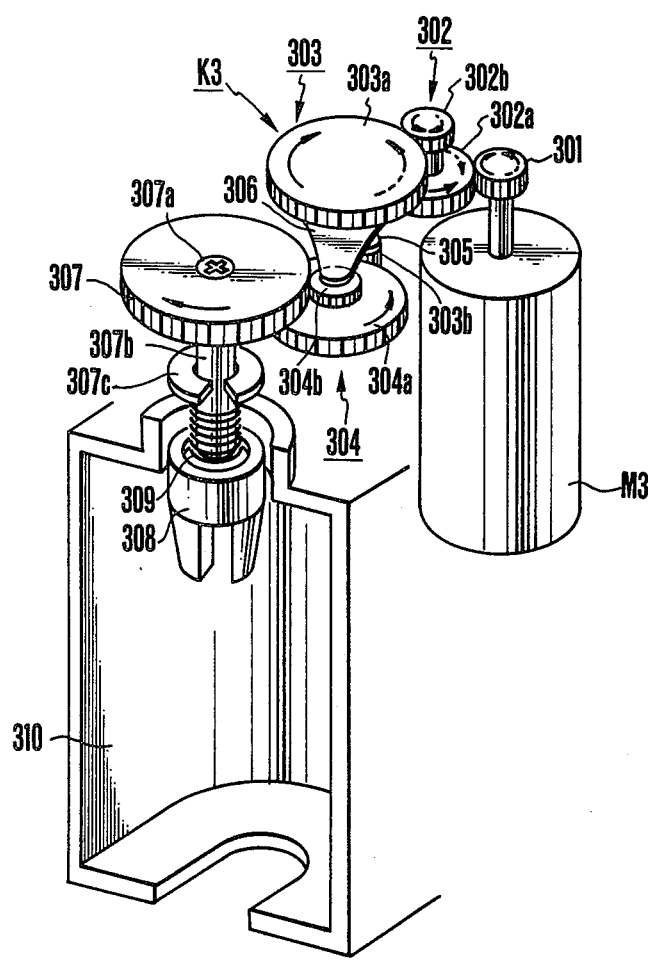
FIG. 6 is a perspective view of the rewind transmission system.

In FIG. 6, there is shown the detail of the rewind motor M3 and the rewind transmission system K3.

A pinion 301 is fixed to the output shaft of the rewind motor M3. A 2-stage gear 302 having a large gear 302a and a small gear 302b is rotatably mounted, the large gear 302a meshing with the pinion 301. Another 2-stage gear 303 having a large gear 303a and a small gear 303b is rotatably mounted, the large gear 303a meshing with the small gear 302b. A planetary lever 306 is pivotally mounted on a common shaft of the gear 303. A compression spring 305 is arranged between the small gear 303b and the planetary lever 306 to bring the planetary lever 306 into frictional contact with the large gear 303a. By this frictional contact the planetary lever 306 is caused to follow up the direction of rotation of the gear 303. Another 2-stage gear 304 having a large gear 304a and a small gear 304b is rotatably mounted on the free end of the planetary lever 306. A gear 307 is mounted on one end of a shaft 307b by a fastener screw 307a, the opposite end of which carries a fork 308. The fork 308 extends into the interior of a cartridge chamber 310, and is arranged to engage with the hub of a supply spool in the cartridge (not shown). A coil spring 309 is arranged between a washer 307c on the shaft 307b and the shoulder of a fork 308 to make it easy to insert the film cartridge into the chamber 310, as the fork 308 can temporarily retract.

When the rewind motor M3 rotates in the clockwise direction, the gear 303 rotates in the clockwise direction, causing the planetary lever 306 to turn in the clockwise direction until the small gear 304b comes to mesh with the gear 307. Therefore, the driving torque is transmitted: the pinion 301→the gear 302 (large gear 302a, small gear 302b)→the gear 303 (large and L small gears 303a, 303b)→the gear 304 (large and small gears 304a, 304b)→the gear 307→the fork 308. Conversely when the rewind motor M3 rotates in the counterclockwise direction, the planetary lever 306 turns in the counterclockwise direction, taking the small gear 304b out of mesh with the gear 307. Thus, the driving torque is not transmitted to the fork 308. Therefore, by rendering the rewind motor M3 to turn some angles in the counterclockwise direction, it is made possible not to add the rewind transmission system K3 and the rewind motor K3 to the winding-up load when the windup motor M2 performs the film winding operation. Thus, the load with which the winding-up of the film accompanies can be minimized.

Figure 7:
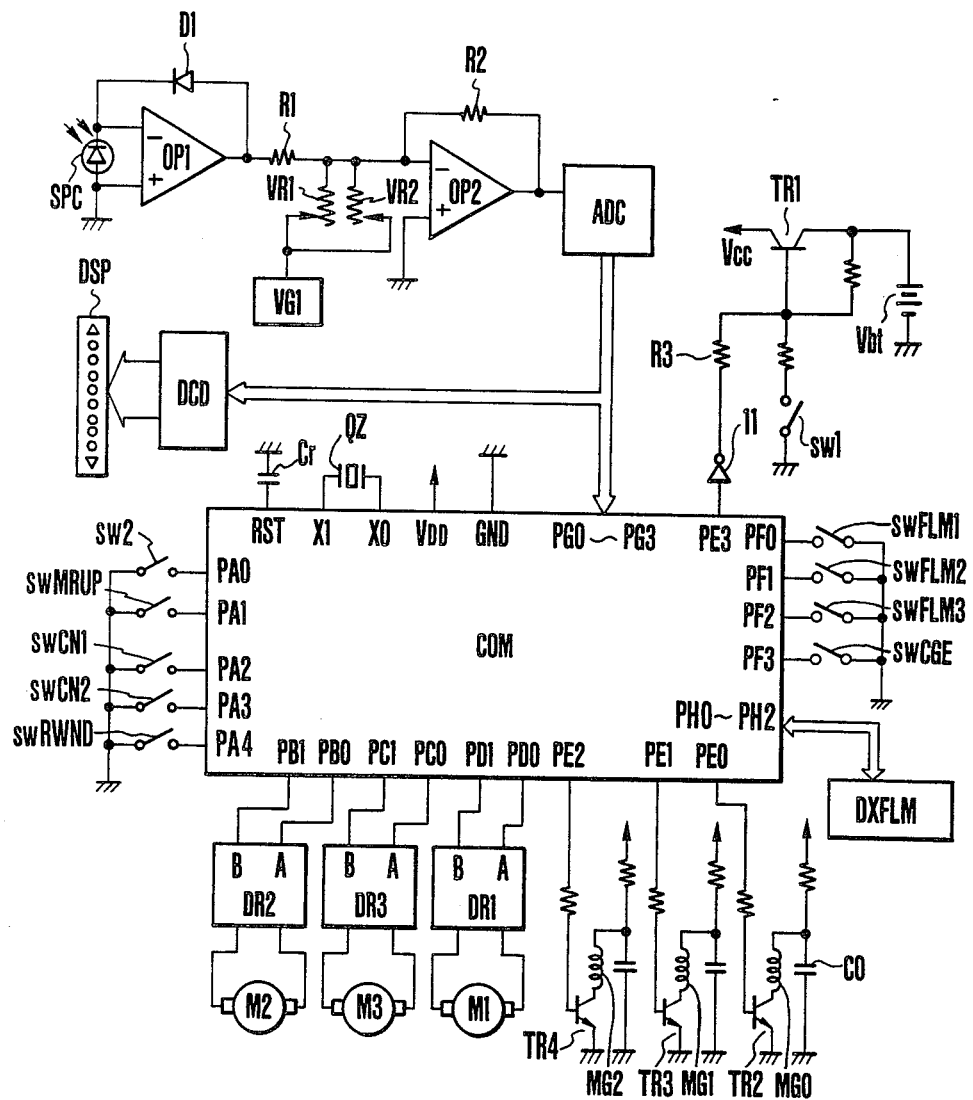
FIG. 7 is an electrical circuit diagram, partly in block form, of the camera with a microcomputer and its peripheral circuits.

FIG. 7 shows a practical example of the electrical circuit using a microcomputer as the control means 1.

A silicon photo-cell SPC receives light from an object to be photographed, producing an electrical signal which is applied to an operational amplifier OP1 of high input impedance with a compression diode D1 connected in the feedback network thereof. The operational amplifier OP1 produces an output representative of logarithmically compressed object brightness information Bv through a resistor R1. Variable resistors VR1 and VR2 connected to a constant voltage source VG1 produce outputs representative of film sensitivity information Sv and aperture value information Av respectively. An operational amplifier OP2 having a resistor R2 connected in the feedback network thereof computes shutter time information $Tv=(Bv+Sv-Av)$. The shutter time information Tv is converted to a 4-bit digital value by an A/D converter ADC, and therefrom routed through a decoder driver DCD to a display DSP within the finder. The microcomputer COM has input ports PG0–PG3 which are connected to the respective output lines of the A/D converter ADC. For note, the 4-bit codes "0001" to "1000" are assigned to the values of 1/1000 to ½ sec. and the others "0000" and "1001" or thereabove to warning signals.

When the release button is pushed down first stroke to turn on a switch sw1, a transistor TR1 is rendered conducting, thereby a voltage from a battery Vbt is supplied as Vcc to the various portions of the circuit. In the figure, the arrow designates this Vcc, and, though the operational amplifiers, A/D converter and others are not given the arrow, the battery voltage Vcc is supplied even to these circuit blocks, as a matter of course. Even after the first stroke switch sw1 has turned off, the supply of the battery voltage Vcc is sustained until the potential at the base of the transistor TR1 is maintained low by giving to it the signal from an output port PE3 of the microcomputer COM through an inverter I1 and a resistor R3.

The microcomputer COM has a terminal RST connected to one pole of a capacitor Cr, a pair of terminals X0 and X1 across which is connected a quartz oscillator QZ, a terminal $V_{DD}$ to which the battery voltage Vcc is applied, and a terminal GND grounded.

Its input ports PA0–PA4 are connected respectively to the outputs of a second stroke sensor or switch sw2 which is arranged to turn on when the release button is pushed down to the second stroke, a mirror-up sensor or switch swMRUP which is arranged upon upward movement of the mirror to turn on and upon downward movement to turn off, an exposure-start switch swCN1 which is arranged to turn off when the leading curtain of the shutter has run down and to turn on when the charging is complete, an exposure-end switch swCN2 which is arranged to turn off when the trailing curtain has run down and to turn on when the charging is complete, and a rewind switch swRWND which is arranged to turn on when the film-rewind release button 11 is manipulated.

Its input ports PF0–PF3 are connected respectively to the outputs of a first film switch swFLM1 consisting of the pulse disc P1 and the contact member S1 (FIG. 5), a second film switch swFLM2 consisting of the pulse disc P2 and the contact member S2 (FIG. 5), a third film switch swFLM3 consisting of the pulse disc P2 and the contact member S3, and a charge switch swCGE consisting of the signal disc fixedly secured to the cam gear 109 (FIG. 4) and the contact member S0 and arranged to turn on when the charging is complete.

Its input ports PH0–PH2 are connected to the respective output lines of a code reader DXFLM for a film cartridge having a DX code labelled on the outer peripheral surface thereof to represent the number of frames and speed of the film.

Figure 8A:
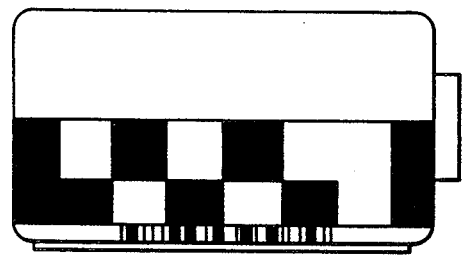
FIG. 8A is a side elevational view of a DX code-labelled film cartridge.
Figure 8B:
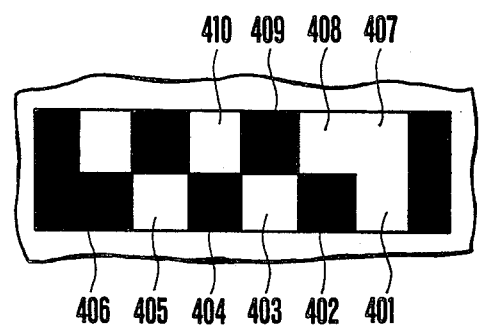
FIG. 8B illustrates the structure of the DX code.
Figure 9:
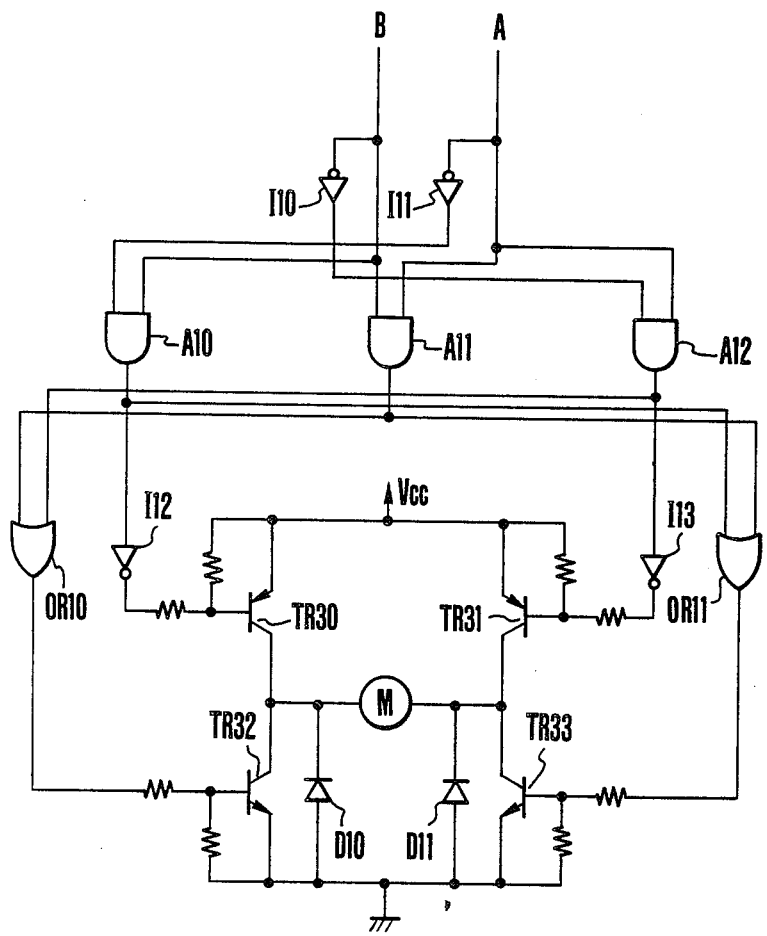
FIG. 9 is an electrical circuit diagram of the motor drive circuit.

Referring next to FIGS. 8A and 8B, the DX code label has compartments 401 to 410 of electrical conduction or non-conduction indicated by white or black color respectively. The film cartridge chamber 310 within the camera housing is provided with probes arranged upon insertion of the film cartridge to contact with the compartments in one-to-one relation.

The compartments 401 and 407 are in contact with the grounded probes, each being electrically conductive. The ones of the probes which are in contact with the compartments 402 to 406 constitute an ISO sensitivity reader element.

The remaining probes which are in contact with the compartments 408 to 410 constitute a second reader element for the maximum possible number of exposure frames of the film.

An example of the coding scheme for the number of exposure frames of film is shown in Table 1 below.

TABLE 1

| Number of Exposure frames | Conductivity of Compartments | | |
|---|---|---|---|
| | 408 | 409 | 410 |
| 12 | + | − | − |
| 20 | − | + | − |
| 24 | + | + | − |
| 36 | − | − | + |
| — | + | − | + |
| — | − | + | + |
| 72 | + | + | + |

In Table 1, + represents that the compartment is electrically conductive as shown by the white color in FIG. 8, and − represents that it is electrically insulated, as shown by the black color.

Though the frame number code is shown in FIGS. 8A and 8B as alternating white and black compartments for the purpose of clarity, and, therefore, it does not display one of the commercially specified values of the frame number, the film cartridge of most popular frame number has such a code pattern that the compartments 408 and 409 both are electrically conductive.

The frame number reader DXFLM is so constructed that, for the electrical conduction or insulation of the compartment 410, a binary "0" or "1" output is produced respectively, being applied to the input port PH2 of the microcomputer COM. The input ports PH1 and PH0 also receive the informations of similar form from the compartments 409 and 408 respectively.

Returning to FIG. 7, the microcomputer COM has output ports PE0–PE2 which are connected to the respective base electrodes of switching transistors TR2–TR4 for a first latch solenoid MG0 equipped with a permanent magnet piece as an actuator for a mechanical release, a shutter release solenoid MG1 controlling the running down movement of the leading curtain of the shutter, and a shutter close solenoid MG2 controlling the running down movement of the trailing curtain.

A pair of output ports PB0 and PB1 are connected to the drive circuit DR2 for the windup motor M2, another pair of output ports PC0 and PC1 are connected to the drive circuit DR3 for the rewind motor M3, and still another pair of output ports PD0 and PD1 are connected to the drive circuit DR1 for the charge motor M1. These three drive circuits DR1–DR3 are similar in construction to one another, their structure being shown in FIG. 9.

A 2-bit signal appears at input terminals A and B. At first, for A=1, B=0, because the signal from the input terminal B is inverted by an inverter I10, the output of an AND gate A12 is "1" and the output of an OR gate OR10 also is "1". Hence, a transistor TR32 is conducting. Also because the output of another inverter I13 is "0", another transistor TR31, too, is conducting. Therefore, the battery voltage Vcc is applied across both ends of winding of the motor M, so that it rotates in a prescribed direction.

When A=0, B=1, because the signal from the input terminal A is inverted by an inverter I11, the output of an AND gate A10 changes to "1". Responsive to this, an OR gate OR11 changes its output to "1", and an inverter I12 also changes its output to "0", thereby transistors TR30 and TR33 are turned on to reverse the direction of current flow to the motor M. Therefore, it rotates in the reverse direction.

For A=1, B=1, the output of an AND gate A11 is "1", causing both OR gates OR10 and OR11 to produce the outputs of "1" to turn on the transistors TR32 and TR33. When any of the normal or reverse drive mode of the motor M transits to this mode, therefore, the transistors TR32 and TR33 in cooperation with diodes D10 and D11 cut off the current supply to the motor M and then short-circuit it. Hence, the motor M is braked against the inertial rotation.

To A=0, B=0 the outputs of the AND gates A10-A12 all become "0", turning off all the transistors TR30-TR33. Therefore, the motor M is in open state.

Figure 10A:
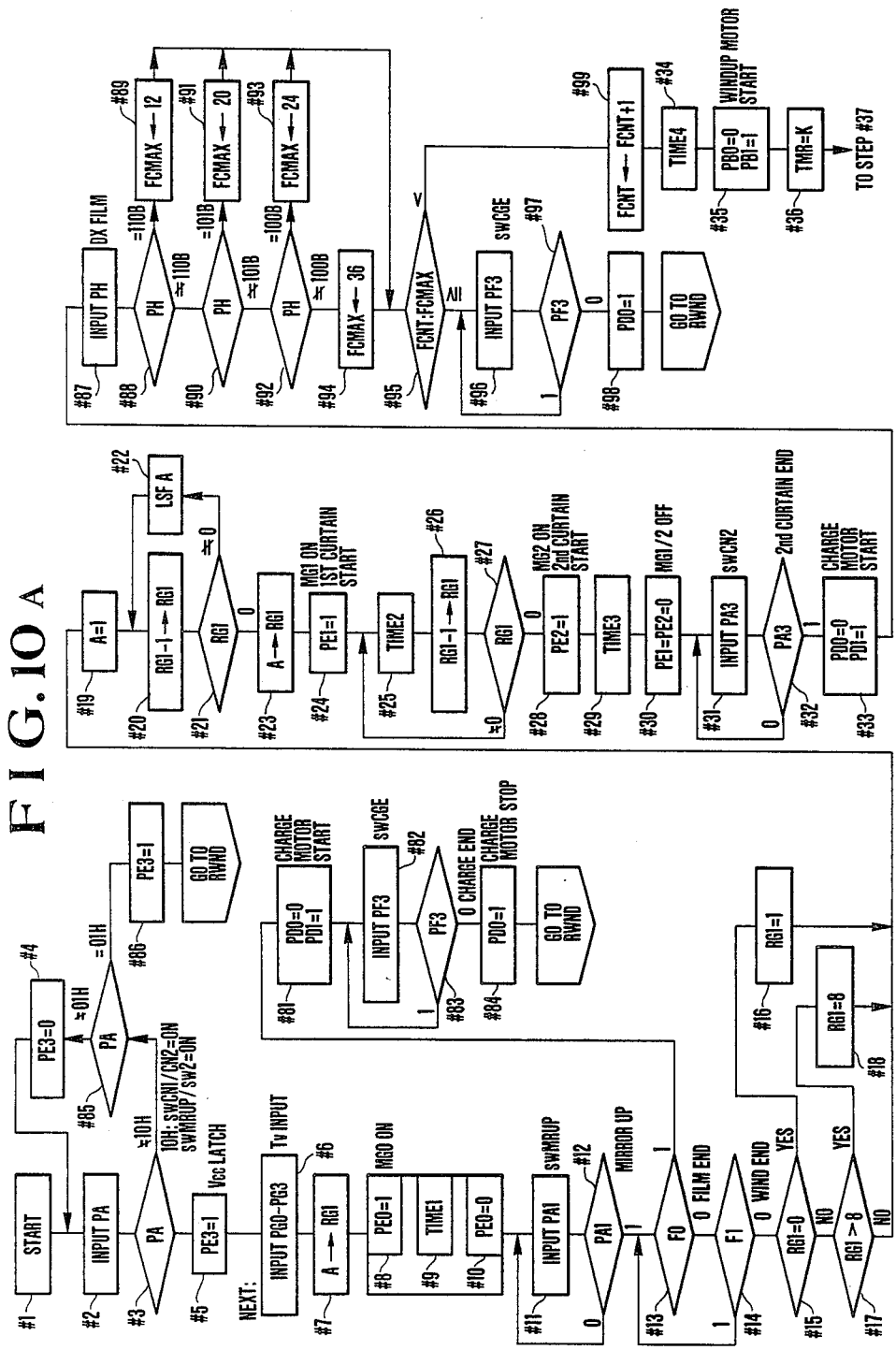
FIGS. 10A and 10B are flow charts for coordination control.
Figure 10B:
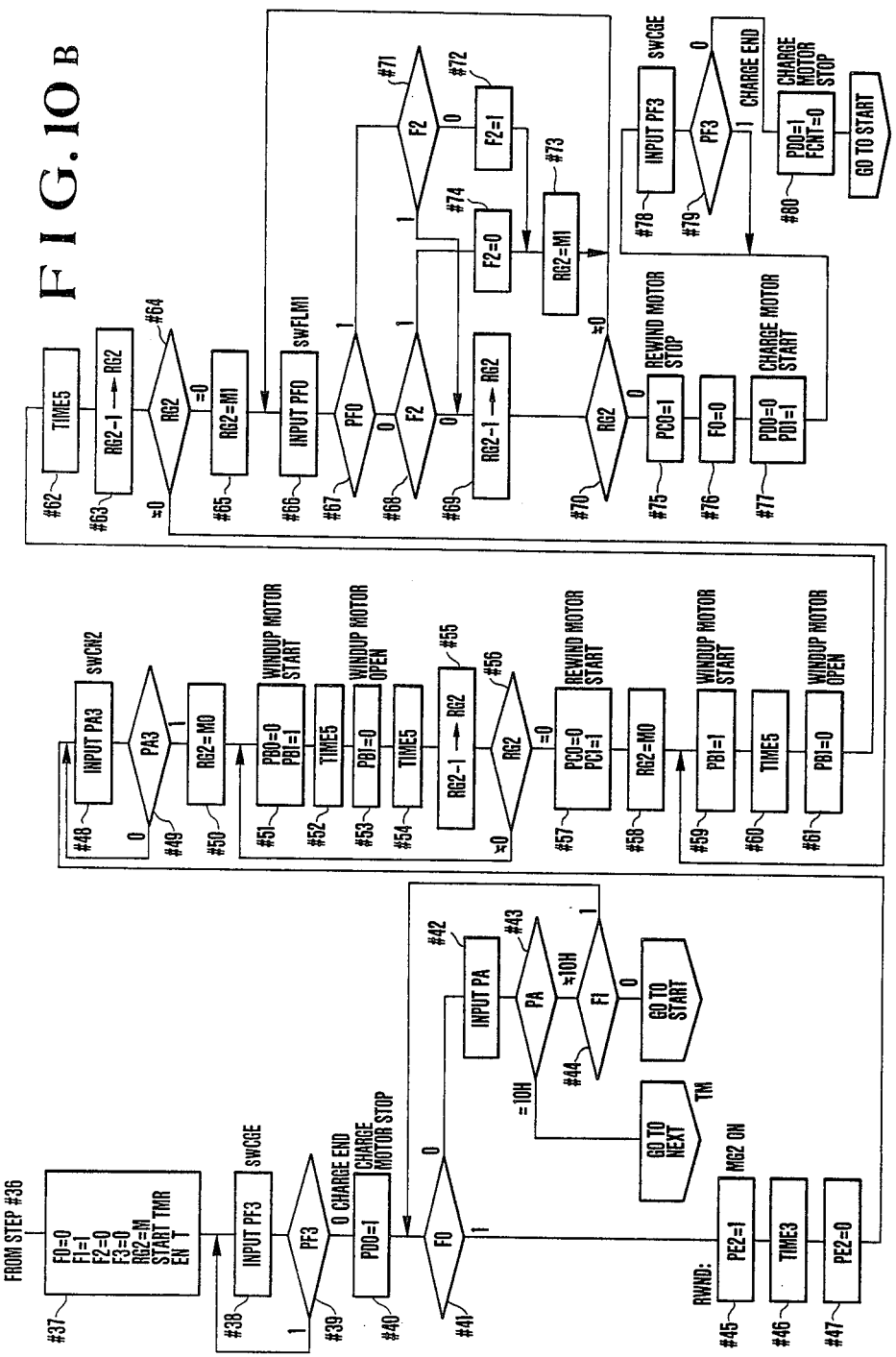
Figure 11:
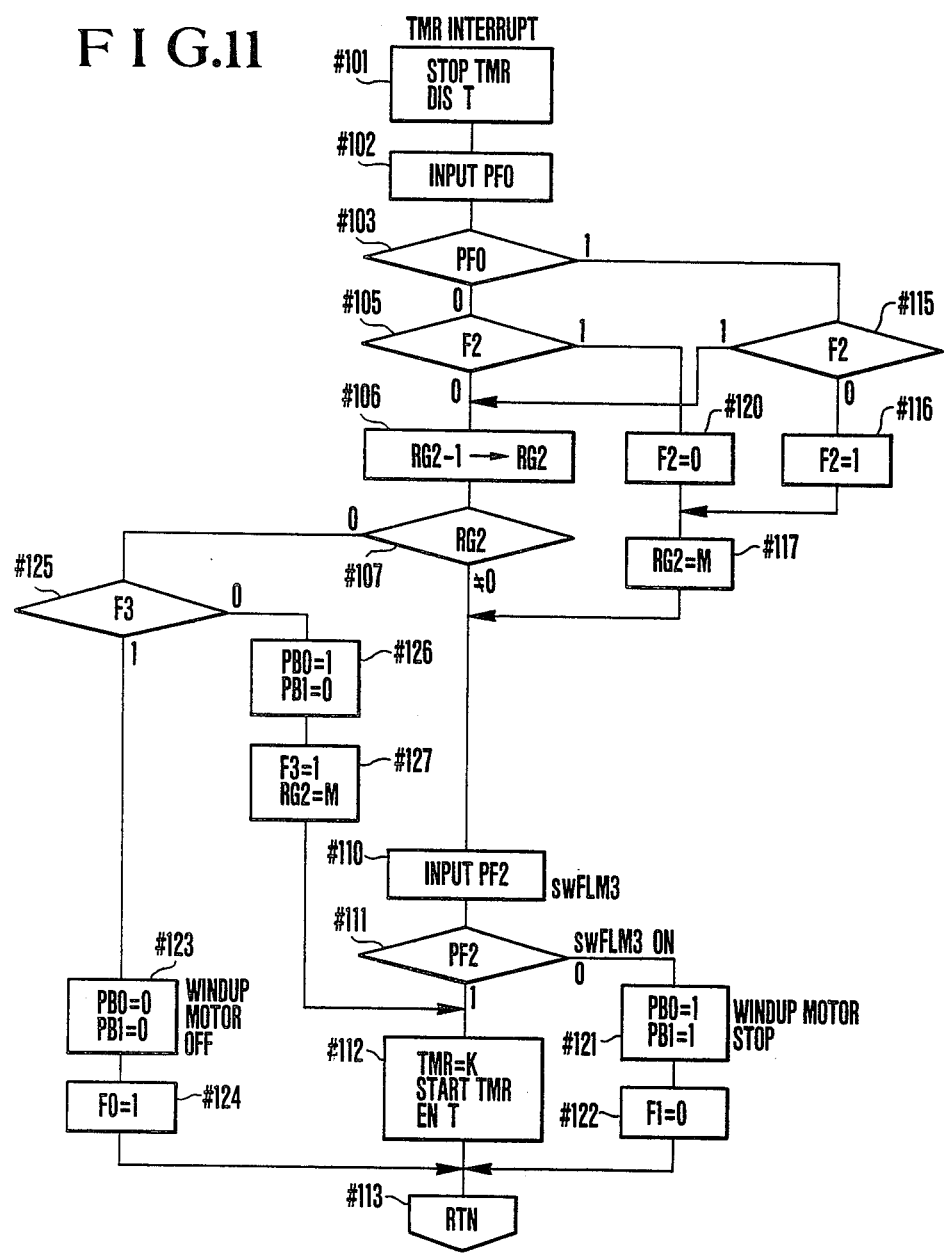
FIG. 11 is a flow chart for timer interruption.

The operation of the microcomputer COM is described by reference to the flow charts of FIGS. 10A and 10B and FIG. 11.

Step #1: When the first stroke switch sw1 turns on to supply the battery voltage Vcc to the microcomputer COM, it is rendered operative. A train of clock pulses from the quartz oscillator QZ starts to enter, and, at the same time, a power-on resetting is effected by the capacitor Cr. A program counter incorporated therein is set to an initial address zero. So, the procedure begins with the start. All the flags are assumed to be "0", and all the output ports also to be "0".

Step #2: Information from the input ports PA0-PA3, (hereinafter called "PA input" information, and the same holds for the other ports) is accepted. If, as any portion of the camera is in charged position, the photographer pushes down the release button to the second stroke without having pushed the film-rewind release button (the rewind switch swRWND), the PA input has a value of "10H" in the hexadecimal number system, since PA0 =PA1 =PA2 =PA3 =0, and PA4 =1.

Step #3: If the PA input is "10H", the flow advances to a step #5. If not so, a loop to a step #85 is encountered.

Step #85: If the PA input is "01H", branch to a step #86. If not so, advance to the next step #4.

Since the rewind switch swRWND is off, because PA4 =1, the PA input does not become "01H". Hence, advance to the step #4. For note, the step #86 will be described more fully later.

Step #4: An instruction that if the PA input is not "01H", then make PE3 output to be "0" now is executed. Since all the output ports are "0" at the time of the power-on resetting, this command would seem to be meaningless. But, because there is the event that a jump from the middle of the program to the step #1 occurs, for this condition (release of the battery voltage Vcc from the latching).

Step #5: When the PA input becomes "10H", that is, when the photographer pushes the release button from the first to the second stroke, a photographic mode is started. PE3 output becomes "1", sustaining the ON state of the transistor TR1. Thus, the battery voltage Vcc is latched.

Step #6: The output of the A/D converter ADC in 4-bit digital form representing the apex value Tv of shutter time is accepted. Because of its having four bits, the values from "0" up to "15" in decimal number system can be taken.

Step #7: Because the PG digit inputted in the step #6 finds itself in an accumulator A, this digit is transferred to an internal register RG1.

Step #8: Change the PE0 output to "1" to turn on the transistor TR2. From a capacitor C0 charged to a voltage almost equal to the battery voltage Vcc, an impulse of current is given to the first latch solenoid MG0, thereupon a release mechanism is actuated to operate.

Step #9: Wait for a time TIME1. This time is spaced out by a constant length timer. To do it, a usable sequence of instructions is that, for example, a certain value is first placed in the accumulator A, and then subtracted one by one until A=0. For the purpose of avoiding the flow chart from becoming more complicated, its illustration is omitted. The same holds for each of TIME2 to TIME5.

Step #10: Return the PE0 output back to "0" to release the first latch solenoid MG0 from being supplied with current. The waiting time TIME1 may be taken at slightly longer a value than the minimum possible time of duration of the impulse. This is then followed by a sequence of operations of closing down the diaphragm and moving the mirror upward which is known to those skilled in the art.

Step #11: The PA1 input representing the position of the mirror is accepted. Since the first latch has been released by the energized solenoid MG0, the mirror will reach its uppermost position in a certain time.

Step #12: A routine for waiting this time until the mirror is up. When the mirror upward movement is complete, the flow advances to the next step #13. This routine is provided for ascertaining that the mirror has completed upward movement before the shutter is released.

Step #13: Test if a flag F0=1 which represents the film end.

Step #14: Test if a flag F1 =0 which represents that the winding up is complete.

Step #15: Examine whether or not the value in the internal register RG1 is "0". As has been described before, for the shorter shutter times than 1/1000 sec. the PG input becomes (0000) or RG1=0.

Step #16: For the case of RG1=0, it is forcibly changed to RG1=1. That is, the minimum allowable value or 1/1000 sec. is set in.

Step #17: Examine whether or not RG1>8, in other words, the required value of shutter time is longer than ½ sec.

Step #18: For the case of RG1>8, it is forcibly changed to RG1=8. That is, the maximum allowable value or ½ sec. is set in.

Step #19: Place "1" in the accumulator A. A routine of steps #19–#22 is to obtain a real shutter time from the content, n, of the internal register RG1 by expanding it as a function of $2^{(n-1)}$.

Step #20: Subtract "1" from the content of the internal register RG1 and enter it again thereto.

Step #21: Test if RG1=0. If so, advance to the next step #23. If not, a loop of step #22 is encountered.

Step #22: Shift the content of the accumulator A leftward. In other words, double it. Suppose the accumulator A has 8 bits, on assumption that RG=8, execution of this instruction is recycled 7 times. Hence, as the initial content of the accumulator A was (00000001), the final one is "10000000".

Step #23: Transfer the content of the accumulator A to the internal register RG1. This implies that the expansion by $2^{(n-1)}$ is completed and the real shutter time is retrieved.

Step #24: Change the PE1 output to "1", causing the solenoid MG1 to be energized. Thereupon, the leading curtain of the shutter starts to run down.

Step #25: Wait for a time TIME2. It is spaced out by using the constant length timer.

Step #26: Decrement one the content of the internal register RG1.

Step #27: Recycle the loop of steps #25–#27 until RG1=0 is reached. Thus, the actual shutter time is being counted.

Step #28: When the counting is complete, the PE2 output is changed to "1", causing the solenoid MG2 to be energized. Thereupon, the trailing curtain starts to run down. Now, the program for controlling the focal plane shutter comes to end.

Step #29: Wait for a time TIME3 necessary for the trailing curtain to move all the way.

Step #30: Return to PE1=PE2 =0 to release the shutter control solenoids MG1 and MG2 from being supplied with current.

Step #31: Accept information from the shutter close sensor or switch swCN2.

Step #32: A routine for waiting the switch swCN2 to turn off, or the completion of the running-down of the trailing curtain. When it is detected, the flow advances to the next step #33.

Step #33: Set PD0=0, PD1=1, thereby the drive circuit DR1 is rendered operative. The charge motor M1 starts to rotate. As it is rotating, charging of the shutter, mirror and automatic diaphragm is carried out.

Step #87: Introduce from the port PH the information representing the number of exposure frames of the used film sensed by means of the DX code.

Step #88: Test if the port PH gives "110B" (in binary number), or PH2=PH1=1, PH0=0. If so, then branch to a step #89. If not, then advance to the next step #90. This binary number is obtained from that DX code pattern which is non-conductive in the compartments 410 and 409 and conductive in the one 408. Referring to the list in Table 1 above, the used film cartridge contains 12 exposure frames at most. The flow branches to the step #89.

Step #89: Put digits of 12 into a film frame number register FCMAX. Then, jump to a step #95.

Steps #90, #91: Similarly to the steps #88, #89, if the DX code is read as 20 in the maximum number of exposure frames of film, then put digits of 20 into the film frame number register FCMAX. A jump to the step #95 then occurs.

Steps #92, #93: Similarly to the steps #88, #89, if it is read as 24, then put these digits into the register FCMAX. A jump to the step #95 then occurs.

Step #94: If the maximum number of exposure frames of film is equal to or larger than 36, then put these digits into the register FCMAX. The step #95 then follows. D Step #95: Compare the content of a film counter FCNT with the content of the film frame number register FCMAX. If the former is smaller, then advance to the next step #99.

Step #99: Increment one the content of the film counter FCNT.

Step #34: Wait for a time TIME4 as a lag from the start of energization of the charge motor M1 to that of the windup motor M2 in order to stabilize the current flow to the charge motor M1. Thereby, the superimposition of the rush current at the start of energization can be prevented from occurring.

Step #35: Set PB0=0, PB1=1 to activate the drive circuit DR2 so that the motor M2 rotates to that direction which causes the coordinating means to select the smaller one of the speed reduction ratios. Thus, the film starts to advance one frame.

Step #36: Set a constant K in a timer TMR for timer interruption. The value of the K is determined depending on the winding-up speed of film, the number of equally divided parts of the pulse disc P1 (FIG. 5) of the first film switch swFLM1 and the instruction cycle time of the microcomputer COM.

Step #37: Start the timer TMR, enabling the timer interruption (EN T). A constant M is placed into an internal register RG2. Flags F0=F2=F3=0, F1=1 are set in. The flag F2 represents the ON-OFF state of the first film switch swFLM1, and the flag M3 indicates the direction of rotation of the windup motor M2. Since the timer TMR has been started, it is then repeating decrement independently of the main program routine. So, interrupting is effected in every constant time (depending on the constant K), and a jump from the program in execution to a timer interrupt address solely used therefor is caused to occur. Here, the timer interrupt handling is explained by reference to FIG. 11.

Timer Interrupt Handling

Step #101: Hinder the decrementing operation of the timer TMR and the interruption.

Step #102: Accept the PF0 input from the first film switch swFLM1.

Step #103: If PF0=0, then advance to a step #105. If PF0=1, then to a step #115.

Step #105: Test the flag F2. Since F2=0 has been set in the step #37, then advance to a step #106.

Step #106: Decrement one the content of the internal register RG2.

Step #107: Test if RG2=0. Because the execution of the program up to the present point results in RG2=M−1, on assumption that the constant M has somewhat large a value, "0" is not reached yet. Then advance to a step #110.

Step #110: Accept the PF2 input from the third film switch swFLM3.

Step #111: Test if PF2=0. For, as the cycle of film winding operation is not complete, PF2 =1, a step #112 follows.

Step #112: Set the constant K again in the timer register, causing the timer TMR to start and enabling the interruption.

Step #113: Return to the original program in execution. The timer interrupt handling has an aim of going from the program in execution to examine the states of the three film switches swFLM1, swFLM2 and swFLM3 in every constant time. Since the program itself goes with execution of its each instruction at a very high speed, no problem will arise in actual practice from the intermittent inputs of film winding information.

Now assuming that in a certain cycle of the timer interrupt handling operation, the first film switch swFLM1 is determined to be off, then advance from the step #103 to a step #115.

Step #115: Test if the flag F2=1. Since F2=0 has been set in the step #37, a step #116 follows.

Step #116: Set the flag F2 to "1". This implies that the first film switch swFLM1 has turned off, or a change to PF0=1 has taken place.

Step #117: Set the constant M again in the internal register RG2. Then return to the step #110 where the above-described routine is executed.

Assuming again that as the timer interrupt handling is further recycled, the first film switch swFLM1 is determined in a certain cycle to have turned on, then advance from the step #105 to a step #120.

Step #120: Set the flag F2 to "0". So, return to the step #117 occurs where the above-described routine is executed. Therefore, each time the on-to-off operation of the first film switch swFLM1 is recycled, the constant M is set in the internal register RG2.

At the termination of each cycle of film winding operation, because the third film switch swFLM3 turns on, the flow goes from the step #111 to a step #121.

Step #121: Change to PB0=1, PB1=1, braking the windup motor M2.

Step #122: Set the flag F1=0. This represents that the winding-up is complete. In the next step #113, return to the original program occurs. Because this loop skips the step #112, no more interruption later takes place.

Next, for example, when the battery voltage falls below the satisfactory operating level, or when the windup load becomes so heavy that the windup motor M2 can no longer move the film, the first film switch swFLM1 gets stopped from further changing over between on and off. Therefore, the flag F2 is left unchanged from "0" or "1", allowing for repetition of the subtraction of "1" from the content of the internal register RG2. In a number of subsequence cycles of the timer interrupt handling operation, RG2=0 will be reached. At this time, a loop is encountered from the step #107 to a step #125.

Step #125: Examine in which direction the windup motor M2 has so far rotated. If the Flag F3=0 representing that the coordinating means is selecting the transmission system of small speed reduction ratio, then advance to a step #126.

Step #126: Reverse the direction of current flow to the windup motor M2 with the aim that the coordinating means selects another transmission system of large speed reduction ratio to operate.

Step #127: As the flag F3 is changed to "1", set the constant M again in the internal register RG2.

Subsequently, the step #112 is executed to proceed the winding-up of the film by the transmission system of large speed reduction ratio, while repeating the timer interrupting operation.

If the use of the transmission system of large speed reduction ratio enables the current cycle of film winding operation to terminate, then advance to the step #121 where the windup motor M2 is braked, and set the flag F1 to "0". Thus, the recycling of the timer interrupting operation is terminated.

If the use of the large speed reduction ratio does not permit the windup motor M2 to proceed moving of the film, as, for example, all the film (the maximum number of exposure frames) has been exposed so that no more fresh area of film can be pulled out from the cartridge, the first film switch swFLM1 is caused not to change again. Therefore, the content of the internal register RG2 is made capable of reaching "0". At this point, the flow advances from the step #107 to the step #125, and because, at this time, the flag F3 takes "1", branches to a step #123 therefrom.

Step #123: Set PB0=PB1=0, opening both ends of winding of the windup motor M2.

Step #124: Set the flag F0 =1. This represents the end of filming.

The foregoing sequence of instructions for the timer interruption is executed all the way from the step #37 to a step #15 for the next shot of the camera in order to control the film winding operation accurately.

We now return to the discussion of the main program routine.

Step #38: Accept a signal representing that the charging of the shutter, mirror and automatic diaphragm is complete from the charge switch swCGE.

Step #39: It constitutes together with the step #38 a routine for waiting until the charging is complete. Needless to say, during this time, a number of cycles of the timer interrupting operation whatever are carried out.

Step #40: Change the PD0 output to "1", thereby the charge motor M1 is braked.

Step #41: Test the flag F0 representing the filming end. Now assuming that the film does not end yet, then advance to a step #42.

Step #42: Similar to the step #2.

Step #43: In case when the photographer makes continuous shootings, the second stroke switch sw2 continues being on to permit the PA input to take a hexadecimal number of "10H". A jump to NEXT (step #6) then occurs. From the step #6 onward, as has been described before, the photographic sequence is advancing.

What should particularly be pointed out here is that without the necessity of ascertaining the termination of the cycle of film winding operation, it is in the step #8 that current is allowed to flow to the solenoid MG0 controlling the operation of the first latch means. That is, the diaphragm closing-down and the mirror-movement operations for the next exposure which have no direct relation to the exposed frame of film in the preceding shot are allowed to be carried out regardless of whether or not the exposed frame has moved away from the film gate. This provides a possibility of achieving an increase in the framing rate.

After that, the step #12 ascertains that the mirror upward movement is complete, and the step #14 ascertains that the winding up is complete. Up to this time, the timer interrupting is effected a number of times whatever. If the winding-up is complete, then advance to a sequence of instructions for the shutter control.

Next, we explain about the single shot mode. After one shot has been taken, the photographer will probably have his finger from depressing the release button to the second stroke. If so, the step #43 is followed by a step #44.

Step #44: Recycle the loop of steps #41–#44 until the completion of the winding up is ascertained in the timer interrupting operation, or F1=0 is become. When the winding up is complete, return to START (step #1) occurs and the battery voltage Vcc is released from the latching in the step #4. If the first stroke switch sw1 also is off, the battery voltage Vcc will disappear. (The photographic sequence ends).

Rewind Handling

When the film is tensioned at a time during the winding-up operation, the time interrupting operation results in the flag F0=1. The flow then branches from the step #41 to a step #45.

Steps #45–#47: Similarly to the steps #28–#30, energize the shutter close control solenoid MG2. Since the trailing curtain runs down, the exposure aperture is covered by the leading and trailing curtains with an advantage that as the photographer has carelessly deprived the camera of the lens, even when strong light strikes the exposure aperture during the rewinding operation, the film is protected from being fogged.

Step #48: Accept a signal from the trailing curtain sensor switch swCN2.

Step #49: Wait until the running down of the trailing curtain is complete, and then advance to a step #50.

Step #50: Set a constant M0 in the internal register RG2.

Step #51: Change to PB0=0, PB1=1 to cause the windup motor M2 to rotate in the clockwise direction, thereby the coordinating means is operated to select the windup transmission system K2 of small speed reduction ratio.

Step #52: Wait for a time TIME5 by using the constant length timer.

Step #53: Change PB1=0 to open both ends of winding of the motor M2.

Step #54: Wait for the time TIME5 by using the constant length timer.

Step #55: Subtract "1" from the content of the internal register RG2.

Step #56: Recycle the sequence of steps #51-#56. Thereby, the windup motor M2 is controlled by means of duty: energization→opening across both ends→energization→opening across both ends and so on, rotating in the clockwise direction with a weak torque. The planetary lever 291a (FIG. 5) also turns in the counterclockwise direction, bringing the large gear 205a into direct engagement with the spool gear 210 so that it wants to rotate the spool structure 22 in a direction to wind up the film. But, because, at this time, the duty control method is employed, even if the film is in the tensioned state, no unduly large stress is given to the film. An equivalent result may be effected by lowering the voltage across both ends of winding of the windup motor M2.

Another advantage arising from the recycling of the steps #51-#56 is that the assurance of establishing the engagement between the large gear 205a and the spool gear 210. That is, there is an event that the phases of rotation of the large gear 205a and the spool gear 210 occurring at the time of counterclockwise movement of the planetary lever 219a coincide with each other so that their tooth crests strike and repel each other. Hence their engagement is difficult to establish quickly. This problem can be overcome by recycling the steps #51-#56 a prescribed number of times.

Step #57: Set PC0=0, PC1=1 to activate the drive circuit DR3. The rewind motor M3 is energized and a rewinding operation is started.

Steps #58-#64: Exactly the same as the steps #50-#56. The windup motor M2 is controlled by means of duty. Since, at this time, the windup and rewind motors M2 and M3 are energized almost simultaneously to constrain each other through the tensioned film, the establishment of engagement between the large gear 205a and the spool gear 210 is further affirmed so as to be maintained during the entire length of the rewinding operation. Then advance to a step #65.

Step #65: Set M1 in the internal register RG2.

Steps #66-#74: This program is similar to that for detecting motion of the film described in connection with the steps #102, #103, #105, #106, #107, #115, #116, #117 and #120 in the timer interruption handling. The termination of the rewinding operation leads to the stoppage of the drive sprocket 29a. This fact is utilized to detect when the rewinding is complete. Then, advance to a step #75.

Step #75: Change to PC0=1 to stop rotation of the rewind motor M3.

Step #76: Reset the flag F0 representing the film end to "0".

Step #77: Set PD0=0, PD1=1 to cause the charge motor M1 to rotate. This is because it happened before the start of the rewinding operation that the trailing curtain ran down in the step #45. So, the shutter mechanism now is returned to the initial or normally charged position.

Step #78: Accept a signal from the charge switch swCGE.

Step #79: Wait until the charging is complete, and then advance to a step #80.

Step #80: Stop the rotation of the charge motor M1, and reset the film counter FCNT to "0". Thus, all the rewind handling is ended. Hence, the flow returns to START (step #1).

Next we consider a situation that as a continuous series of shots goes on, because the charging of the shutter, mirror and automatic diaphragm is completed earlier than usual, it is before the winding-up is not complete yet and after the first latch solenoid MG0 has been energized for the next shot by the steps #8-#10, that the film comes to end.

Since, in this case, an actuation of mechanical release has been done, the diaphragm is closed down and the mirror is moved upward. But, because the film is stopped in the middle of the winding operation, leaving the third film switch swFLM3 in OFF state. If this condition is not altered before the camera is switched from the windup to the rewind mode, the photographer will mistake it for the shutter being left open and do improper management. Another problem is that if the lens is pointed to a strong light source, the film will be fogged. From these reasons, it is desirable to once move the mirror downward before the start of the rewinding operation.

After the presence of the mirror in the upper most position has been ascertained in the step #12, at a time during the waiting for the termination of the winding operation in the steps #13 and #14, the time interrupting operation results in detection of the film end with the setting of the flag F0=1 in the step #124. Therefore, the flow branches from the step #13 to a step #81.

Step #81: Set PD0=0, PD1=1 to rotate the charge motor M1.

Steps #82-#83: Check the completion of the charging.

Step #84: Change to PD0=1 to brake the charge motor M1. Because, in this state, the mirror is charged, it moves downward to the initial position. A jump to RWND (step #45) then occurs to allow for the start of a rewinding operation.

Next, we explain about the manual switching of the camera from the windup to the rewind mode.

As the input port PA is accepted in the step #2, when the film rewind release button 11 is pushed down to close the rewind switch swRWND, PA4 =0 is obtained. If, at the same time, the photographer does not push down the release button and the various portions of the camera are in their charged positions, PA0=1, PA1=PA2=PA3=0 are obtained. Hence, the PA input has a hexadecimal number of "01H". Therefore, the flow branches from the step #85 to a step #86.

Step #86: Change the output port PE3 to "1"to sustain the conduction of the transistor TR1 so that the battery voltage Vcc is latched. A jump to the RWND routine then occurs, and a rewinding operation is started.

Next, we explain about the use of the DX code for automatically switching the camera from the windup to the rewind mode.

If, in a step #95, the content of the film counter FCNT is determined to be equal to or larger than the maximum number of exposure frames of film defined by the DX code, then advance to a step #96 for automatic transition to the rewind mode by means of the DX code.

Steps #96–#98: Similarly to the steps #38–#40, wait until the charge motor M1 completes the charging. What is different between this routine and that for the normal winding up is that only the charging by the charge motor M1 is operated, leaving the film unwound. Because the equal number of frames to that defined by the DX code have already been exposed, all what to do next is only to rewind the film without having to wind up the film.

Then, when the charging by the charge motor M1 is completed, an advance to the RWND routine occurs, and the rewinding operation is started.

It will be appreciated from the foregoing illustrated embodiment that one of the features which are characteristic of the invention is in the method of detecting when all frames of the film have been exposed. Even though the winding up operation is being performed, the film does not advance through the full length of one film under a first condition that the usual windup transmission system of small speed reduction ratio is in operation. Then, this condition is changed to a second one that a second transmission system of large speed reduction ratio is used instead. If the stoppage of the film is detected even under the second condition, this is finally taken as the end of the filming. Therefore, while the stoppage of the film is only due to the increase of the load on the transmission system, or the battery voltage falls below the satisfactory operating level, the mistaking of it for the film end can be absolutely prevented. This makes it possible to use all the exposure frames of the film.

Another feature of the invention is that the manner in which the automatic switching of the camera from the windup to the rewind mode is operated at the film end is made differentiated from that in which a manual switching is operated at a desired time by means of the rewind switch. Particularly in the manual switching of the camera to the rewind mode, the number of operations is limited to a minimum, thereby giving advantages that wasteful consumption of electrical energy of the battery is prevented, and that the start of the rewinding operation is speeded up.

What is claimed is:

1. A film drive device for a camera for transporting the film by an electric motor as the drive source, comprising:
   (a) detecting means for detecting that all frames of the film have been wound up;
   (b) manually operable switching means for forcibly changing over the film to a rewind state; and
   (c) operation control means for shifting from a film windup state to the film rewind state, said operation control means making different a first operation of detecting the completion of the winding up by said detecting means to shift to the film rewind state and a second operation of shifting to the film rewind state by said switching means from each other.

2. A camera according to claim 1, wherein said detecting means detects that the winding of all frames of the film is complete when the film does not move in a direction to be wound up despite the driving of said motor.

3. A camera according to claim 1, wherein said switching means includes a switch member accessible from the outside of said camera.

4. A camera according to claim 1, wherein the time of performance of said second operation is made shorter than that of performance of said first operation in said operation control means.

5. A camera according to claim 1, wherein said first operation in said operation control means, after the completion of the winding of all the frames of the film has been detected by said detecting means, performs a re-detection of whether or not the completion of all the frames of the film is affirmed again, and, after that, shifts to the film rewind state,
   and wherein said second operation shifts to the film rewind state in response to said operation of said switching means.

6. A film drive device for a camera comprising:
   (a) a first motor;
   (b) a windup transmission system for driving the film to wind up by said first motor as the drive source;
   (c) a second motor;
   (d) a rewind transmission system for driving the film to rewind by said second motor as the drive source;
   (e) detecting means for detecting a pulled-up state of the film, said detecting means detecting the pulled-up state of the film when the film does not move in the direction to wind up despite said first motor drives in the direction to wind up;
   (f) manually operable switching means for forcibly changing over the film to the rewind state; and
   (g) operation control means for shifting from the film windup state to the film rewind state by driving said second motor to the rewinding direction, said operation control means differentiating a first operation of shifting to the film rewind state in response to detection of the pulled-up state of the film by said detecting means from a second operation of shifting to the film rewind state by the operation of said switching means.

7. A camera according to claim 6, wherein said switching means includes a switch member accessible from the outside of said camera.

8. A camera according to claim 6, wherein the time of performance of said second operation is made shorter than that of performance of said first operation in said operation control means.

9. A camera according to claim 6, wherein said first operation in said operation control means, after the pulled-up state of the film has been detected by said detecting means, performs a re-detection of whether or not the winding of all the frames of the film is completed again, and after that drives said second motor to said rewind direction to shift to the film rewind state,
   and wherein said second operation drives said second motor to said rewind direction in response to the operation of said switching means to shift to the film rewind state.

10. A film drive device for a camera in which the film is wound up by an electric motor as the drive source, comprising:
 (a) film windup means capable of changing over between the winding of the film by a first torque and the winding of the film with a larger second torque than said first torque; and
 (b) detecting means for detecting the completion of the winding of all the frames of the film, said detecting means changing over said film winding means to said second torque when the film does not move a prescribed distance within a prescribed time as the winding drive of the film is carried out by said first torque, and detecting the completion of the winding of all the frames of the film when the film does not move the prescribed distance within the prescribed time even though the film winding drive is carried out with said second torque.

11. A camera according to claim 10, wherein said film winding means has a first windup transmission system for winding up the film by said first torque, a second windup transmission system for winding up the film by said second torque, and a clutch for changing over the transmission of rotation of said motor between said first windup transmission system and said second windup transmission system.

12. A camera according to claim 11, wherein as said clutch use is made of a planetary clutch, and the changing over of the transmission of rotation between said first windup transmission system and said second windup transmission system is performed by changing over the direction of rotation of said motor.

* * * * *